United States Patent Office 2,733,855
Patented Feb. 7, 1956

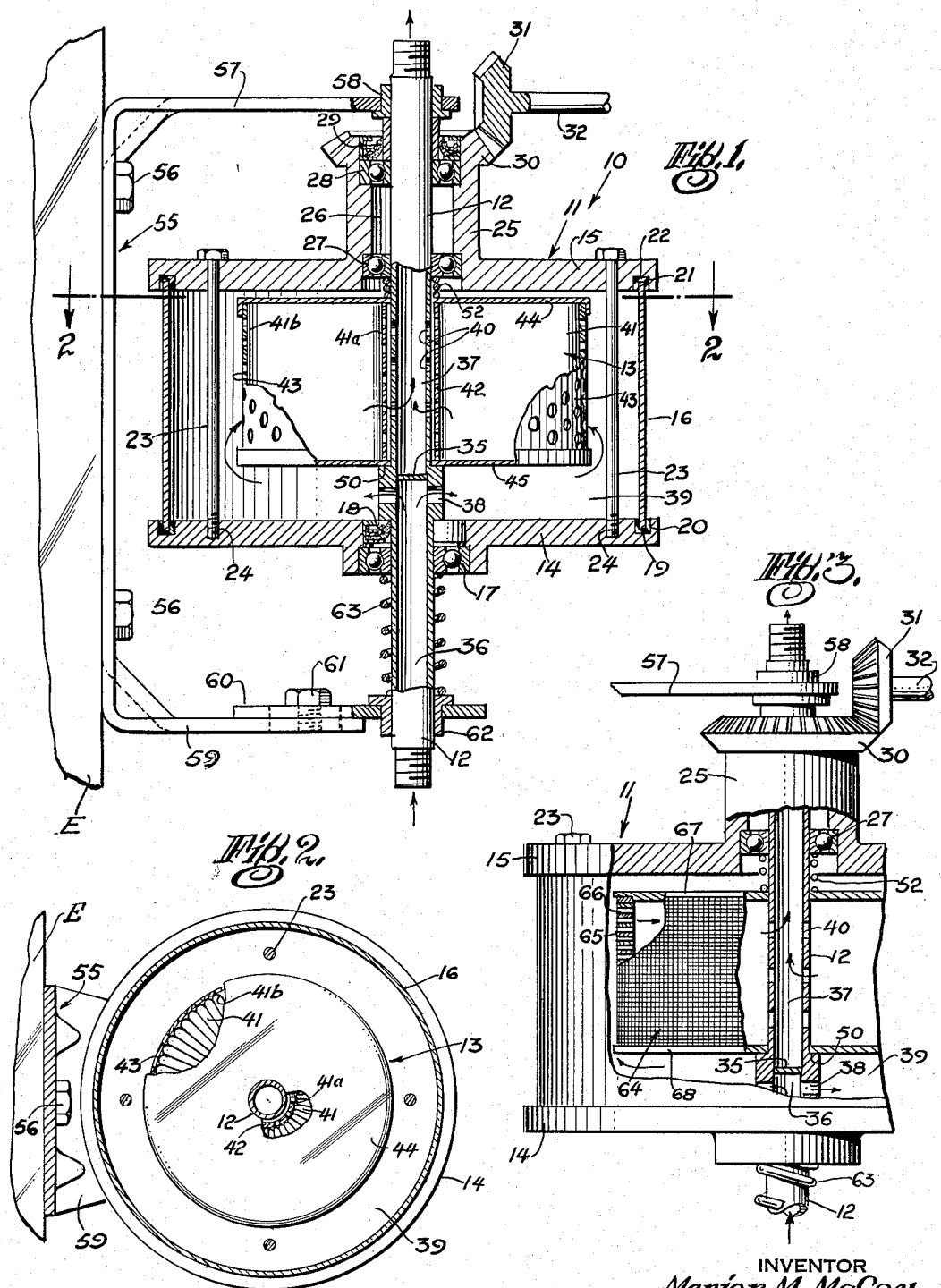

2,733,855
MULTISTAGE FILTER

Marion M. McCoy, New Market, N. J., assignor to Purolator Products, Inc., Rahway, N. J., a corporation of Delaware Application November 20, 1953, Serial No. 393,369

4 Claims. (Cl. 233—2)

This invention relates to improvements in filters for fluids and more particularly to a filter that will provide multi-stage filtration.

Objects and features of this invention are to provide a multi-stage filter providing both centrifugal and surface type filtration and utilizing in combination a conventional surface type filter element and a centrifugal filter, which combination will result in highly efficient filtration and which combination embodies simplicity in its construction for operation in the intended manner.

In the practice of the invention high filtration efficiency is obtained by combining a conventional surface type of filter element with a centrifugal filter in such a way that the liquid to be filtered must flow through both the centrifugal filter and through the surface type filter element. In its flow through the centrifugal filter some of the contaminant particles are removed from the fluid by centrifugal action, and in its flow through the surface type element other particle contaminants in the fluid are removed by the action of the surface type filter element.

In practicing the invention the surface type filter element is mounted upon a stationary center tube within a housing which completely surrounds and encloses the surface type element. The housing is supported for rotation on the center tube. The fluid to be filtered is admitted to the housing under pressure through appropriate openings in a portion of the center tube and fills the space within the housing surrounding the surface type filter element. The housing is rotated and its rotation imparts a whirling action to the fluid admitted to said housing. The whirling action imparted to the fluid has a centrifugal effect which tends to throw particles of contaminant in the liquid radially outward toward the inner boundary surface of the housing where they collect as a sludge. The pressure of the fluid admitted into the housing also forces it to flow through the surface type filter element while the fluid is being whirled and after passage through the latter it enters another portion of the center tube as filtered fluid. This filtered fluid is circulated as desired. In the forced passage of the fluid through the surface type filter element particles of contaminant not removed by the centrifugal action are trapped by said surface type filter element. The double filtration of the fluid resulting from the centrifugal forces caused by whirling of the fluid in the rotating housing and the trapping action of the surface type filter element provide in effect multi-stage filtration one stage of which is centrifugal filtration and the other stage of which is surface filtration. The two stages remove substantially all filterable contaminants from the fluid in an efficient manner.

Objects and features of the invention include the provision of novel structure for effecting the multi-stage filtration just described in as simple and economical a manner as possible.

Further objects and features of the invention are the provision of a filter of the character described which will facilitate ready cleaning of the filter and all of its components when necessary and which will facilitate the ready replacement of clogged surface type filter elements used therein.

Other objects and features of the invention are to provide a filter of the character described that may be easily installed for operation in automotive engines to filter its lubricating oil.

Other objects and features of the invention will become apparent from the following description and the accompanying drawing wherein:

Fig. 1 is a vertical section of one embodiment of the invention;

Fig. 2 is a transverse sectional view of the device of Fig. 1 taken along line 2—2 of the latter and viewed in the direction of the arrows, portions being broken away to illustrate structural details; and Fig. 3 is a partially sectionalized fragmentary elevational view of a modified embodiment of the invention.

Referring to the drawing and first to Figs. 1 and 2, the reference character 10 denotes generally a multi-stage filter embodying the invention. This filter 10 includes a filter housing 11 that is rotatively supported as will be described on a vertically disposed center tube 12. The housing 11 encloses a stationary surface type filter element 13 which is removably supported on a portion of the center tube 12 as will be presently described.

In the embodiment shown, the filter housing 11 includes a bottom member 14, an axially aligned top member 15 and a cylindrical or tubular shell 16 extending between the top and bottom members 14 and 15. The bottom member 14 is supported for rotation on the center tube 12 as by a ball-bearing arrangement 17. A packing member 18 serves to prevent leakage of fluid or liquid admitted to the housing 11 outwardly of the latter past the bearing 17. The upper face of the bottom member 14 has an annular groove 19 in which the lower end of the shell 16 is supported. A suitable gasket 20 is provided in the groove 19 to prevent leakage around the lower end of shell 16. The upper or cover member 15 has a similar annular groove 21 provided with a sealing gasket 22 which has a similar leak-preventing function for the upper end of the shell 16 which is received within the groove 21.

The bottom member 14, upper or cover member 15 and the shell 16 are held in dismountable assembled relationship in any convenient way. For example, the headed bolts 23 extending through the cover member 15 into threaded sockets 24 in the bottom member 14 may be utilized. When these bolts are tightened into their sockets they serve to join the bottom member and the cover member 15 and to clamp the ends of the shell 16 against the sealing gaskets 20 and 22 in the respective grooves 19 and 21, thus providing leak-proof joints between the ends of shell 16 and the lower and upper members 14 and 15 in the respective grooves 19 and 21.

An axially disposed and centrally located tubular part or extension 25 extends from the outer surface of the cover member 15. The bore 26 of this tubular extension 25 is of substantially larger diameter than the center tube 12 and a pair of ballbearings 27 and 28 similar to the ballbearing arrangement 17 are positioned at spaced apart locations within the bore 26. These ballbearings 27 and 28 provide rotative support for the cover member 15 on the center tube 12. The three ballbearings 17, 27 and 28 thus provide effective rotative support for the housing 11 about the stationary center tube 12 as an axle. A packing member 29 above the ballbearing 28 serves to prevent leakage of liquid outwardly of the housing 11 past the ballbearing 28.

A bevel gear 30 is provided at the outermost end of the tubular part or extension 25. This gear 30 may be integral with said extension or be appropriately secured thereto. A bevel driving gear 31 is provided and is positioned to mesh with the gear 30. The driving gear 31 is carried by a shaft 32 which is driven in any convenient way from an automotive engine crankshaft or cam shaft (not shown). The ratio of the gears 30 and 31 is such that the housing 11 will rotate at the speed of the engine driving the shaft 32. In other words, the housing 11 will rotate at engine speed. Other speeds may be selected by any appropriate change in the gearing ratio.

The center tube 12 is provided internally with a partition 35 which effectively divides its bore into two separate compartments 36 and 37. The partition 35 may be a disc inserted into the bore of center tube 12 and welded or otherwise fixed in the position shown to prevent any direct flow of fluid from compartment 36 to compartment 37 or vice versa. The compartment 36 has lateral passageways or openings 38 which open directly into the interior chamber 39 of the housing 11. The compartment 36 in the embodiment shown is the lower compartment of the center tube 12 and it is connected at the lower end of the center tube 12 to a delivery line (not shown) via which liquid or fluid to be filtered is delivered under pressure, for example, from an engine oil pump (not shown) to the compartment 36. The fluid delivered to compartment 36 under pressure is admitted to or enters the chamber 39 of the housing 11 via the lateral passageways 38 which are located below the partition 35.

The upper compartment 37 of the center tube 12 constitutes an outlet for fluid delivered to the housing 11 after it has been subjected to multi-stage filtration therein as will be described. The wall of the center tube 12 in its compartment 37 has slots, perforations or openings 40 which are positioned above the partition 35. These openings 40 are all located internally of the housing 11.

The surface-type filter element 13 is replaceably carried on the center tube 12 within the housing 11. This filter element 13 preferably has generally cylindrical shape and its dimensions are such that it does not fill the entire inner space or chamber 39 of the housing 11.

The specific construction of the surface-type filter element 13 in itself does not constitute part of the instant invention. For illustrative purposes, however, the filter element 13 shown in Figs. 1 and 2 is of the convoluted resin impregnated paper type such, for example, as filter elements which are the subject matter of Bell Patent No. 2,642,187 and Layte et al. Patent No. 2,642,188 both issued June 16, 1953. Such elements comprise generally a pleated filter element body 41 of resin impregnated paper arranged in the form of a tubular annulus in which the pleats extend substantially radially of the axis of the annulus and in which the folds of the pleats extend in the axial direction of the tubular annulus. The inner folds 41a of the pleated body 41 are in surface contact with a perforated center tube 42. The outer folds 41b of the pleated body 41 are surrounded by a pervious or perforated covering 43 of paper or the like. The upper and lower ends of the pleated filter body 41 are covered by end discs or caps 44 and 45 which are sealed to the respective end edges of the body 41.

The filter element 13 construction as just described is mounted on the center tube 12 with the said tube 12 extending through the center tube 42 of the filter element. The lower end cap 45 rests upon an annular shoulder 50 provided on the surface of center tube 12 above the level of the lateral passageways or openings 38. The shoulder 50 serves as the lower support of the filter element 13 and spaces its bottom disc 45 from the bottom member 14 of the housing 11. The perforations 40 of center tube 12 lie in flow relationship with the perforations of the center tube 42 of the filter element. The openings or perforations 40 of the center tube 12 terminate below the level of the uppermost end cap 44 of the filter element 13. The fit of the end cap 44 about the surface of the center tube 12 is sufficiently tight to prevent leakage of the fluid between their contacting surfaces.

A compression spring 52 is positioned on the center tube 12 between the upper surface of end disc 44 and the under surface of the stationary portion of the bearing 27. This spring 52 presses the filter element 13 toward and against the shoulder 50 and prevents accidental axial displacement of the filter element 13 on the center tube 12 during use. The spring 52 also provides sealing pressure between the lower surface of the end disc 45 and the shoulder 50 to prevent leakage of fluid between the contacting surfaces at shoulder 50. The axial and peripheral dimensions of the filter element 13 are such that it does not anywhere make contact with any of the internal walls of the rotary housing 11. In other words, filter element 30 does not fill the chamber 39 of said housing.

A bracket 55 is provided to support the center tube 12 in a stationary and in this instance vertical position from an appropriate portion of an automotive engine E. The bracket 55 is secured to the engine E, for example, by bolts 56. The bracket 55 includes a horizontally disposed upper arm 57 provided with a receiving socket 58 into which the upper end of center tube 12 may be removably inserted. A lower horizontally disposed arm 59 constitutes part of the bracket 55. A swing arm 60 is secured for rotation in a horizontal plane to the lower arm 59 as by a pivoting and tightening bolt 61. The arm 60 includes a receiving socket 62 through which the lower end portion of the center tube 12 extends. A spring 63 is positioned on the center tube 12 between the upper surface of socket 62 and the lower surface of the stationary portion of the bearing 17. This spring 63 imparts an upward bias to the rotatable housing 11 sufficing normally to maintain meshing engagement between the two bevel gears 30 and 31.

When it is desired to disassemble the filter 10 for the purposes of replacing its surface type filter element 13, the bolt 61 is loosened and the housing 11 is pressed downwardly against the biasing action of spring 63 for a sufficient amount to disengage the top end of center tube 12 from the upper socket 58. The entire housing 11 may then be swung with the arm 60 about the bolt 61 as a pivot to disengage the gear 30 from the gear 31. The bolts 23 may then be loosened and the cover 15 separated from the shell 16 completely to permit replacement of the filter element 13. If such replacement is not necessary the cover 15 may be sufficiently raised from the shell 16 to permit cleansing of the interior wall of the shell. After repositioning of the lifted or removed cover 15 and retightening of the bolts 23 the upper end of center tube 12 is reinserted in the socket 58 of the bracket arm 57 and the bolt 61 of swing arm 60 is retightened. The spring 63 then again effects meshing of the bevel gear 30 with the bevel gear 31 whose location is fixed in any desired way and the device is again ready for operation. It is understood of course that the outlet line (not shown) coupled to the upper end of the center tube 12 will have to be uncoupled to permit the cleansing or replacement separation of separable parts of the filter housing 11 as just above described.

In operation of the device with the engine running the gear 31 drives bevel gear 30 and as a result rotates the housing 11 at engine speed. Liquid or fluid, in the present embodiment oil, to be filtered is pumped under pressure to the lower or inlet compartment 36 of the center tube 12. The oil from compartment 36 enters the chamber 39 of the rotating housing 11 under pressure via passageways 38 and fills said chamber. The rotation of the housing 11 imparts a whirling action to the fluid that has entered or been admitted to its chamber 39. The whirl imparted to the fluid causes some of the solid contaminants contained in the whirling fluid to be thrown radially outwardly under action of centrifugal forces against the inner surface of the shell 16 where they collect as a sludge. At the same time the pressure of the oil being delivered to the compartment 39 via the passageways 38 (when said chamber 39 is filled) forces flow of oil in the chamber 39 through the filtering body 40 of the surface type filter element 13 and via its perforated center tube 42 and the openings 40 of the center tube 12 into the outlet compartment 37 of the latter. In this forced flow through the body 41 of the surface type filter 13 those solid contaminant particles which have not been removed by the centrifugal filtering action caused by whirling of the fluid in chamber 39 are trapped in usual way on the surface of the filtering body 41 of the surface type filter element 13. The fluid reaching the outlet compartment 37 of the center tube 12 is in highly filtered condition because of the multi-stage filtering action thereon occurring in the filter 10, namely the centrifugal filtration caused by the whirling of the fluid in the rotating housing 11 and the surface type filtration effected by passage of the fluid through the body 41 of the surface type filter 13.

The contaminants which accumulate on the inner surface of the shell 16 as a result of the centrifugal filtration in the form of a sludge, may be readily removed by disassembling the filter housing 11 as hereinabove described and scraping or washing the sludge accumulation from the shell wall. At the same time during such disassembly, if the amount of contaminants trapped by the body 41 of the replaceable filter element 13 are sufficient to clog the said filter element, the latter may be replaced if it is of a non-reusable type or else it may be cleaned in any conventional way if it is of a reusable type.

The replaceable surface type filter element 13 of Figs. 1 and 2 is ordinarily non-reusable. In Fig. 3 a metallic edge type surface filtering element 64 is shown as having been substituted for the filter element 13 of Figs. 1 and 2. This edge type element 65 is reusable and may, for example, be constructed as described in the U. S. Patent No. 2,042,537 to Liddell or in U. S. Patent No. 2,622,738 to Kovacs. Such elements comprise generally a flat ribbon 65 having spaced-apart ribs on one of its wide surfaces. The ribbon 65 is coiled to form a tubular helix. The ribs on the ribbon space the adjacent turns of the helix and also define filtering interstices 66 of determined dimensions between the turns through which the fluid to be filtered must flow. The dimensions of the interstices 66 determine the extent of filtering action of fluid passing therethrough. End caps 67 and 68 close off opposite hands of the helically wound element 64. As shown in Fig. 3, the flow of fluid from the compartment 39 of the rotatable casing 11 is through the filtering interstices 66 of the element 64 from its outside in and thereafter via the perforations 40 in the center tube 12 into the compartment 37. The surface type filtering action of the helically wound surface type filter element 65 just described is similar to that of the surface type filter element 13. However, the element 64 may be cleansed without replacement by reverse flushing which acts to clear the accumulation of the contaminants on the outer surface of the helical element 64. Since preferably the helical element 64 is of metal the life of such a filtering element is considerably longer than that of the paper type element 13 which usually must be replaced when clogged. The same multi-stage filtration results when the helically wound surface type filter element 64 is used in the housing 11 instead of the paper surface type element 13. In other words, the rotation of the housing 11 provides centrifugal filtering action to remove some of the solid contaminants, and the surface type helical element 64 removes other solid contaminants by surface filtration so that the fluid reaching the outlet compartment 37 of the center tube 12 is highly filtered.

While specific kinds of surface type filter elements have been described, it is understood that other types of surface filter elements may be substituted. For example, a series of superposed paper discs such as those disclosed in the patent to Wells No. 2,103,572 may be mounted on center tube 12 in substitution for the surface type elements 13 or 60.

In the foregoing disclosure specific embodiments of the invention have been described and shown. Variations in structural detail within the scope of the appended claims are possible and are contemplated. There is not intention therefore of limitation to the exact details shown and described.

What is claimed is:

1. A filtering apparatus for fluid comprising a rotatable filter housing, means for rotating said housing, a hollow, perforated center tube mounted to extend along the axis through said housing, a filter element mounted on said center tube in said housing, said element and said center tube remaining stationary during rotation of said housing, and means for directing passage of said fluid into said housing and then through said element and thereafter outwardly via said center tube for contaminant removal, and including a partition within said center tube.

2. A filtering apparatus for fluid comprising a rotatable cylindrical filter housing, means for rotating said housing, a hollow, perforated center tube mounted on the axis of said housing, a cylindrical filter element mounted on said center tube, said center tube and said element remaining stationary when said housing is rotated, and means for directing passage of said fluid into said housing, through said element, and outwardly via said center tube.

3. In a filter device, a center tube, a housing, means for rotatably supporting said housing on said center tube, said center tube having an inlet portion with passageways for admitting fluid to be filtered into said housing, means for rotating said housing, a stationary surface type filter element carried by said center tube within said housing, said center tube having an outlet portion with passageways to permit egress of fluid within said housing that passes through said surface type filter element, and partitioning means between said center tube portions to prevent mingling of the fluid in the inlet portion of said center tube and the fluid in the outlet portion of said center tube.

4. In a filter device, a center tube having an inlet portion and an outlet portion, partitioning means separating said two portions, bracket means for supporting said center tube from an engine, a filter housing, means for rotatably mounting said housing on said center tube, means for rotating said housing, said inlet portion of said center tube having passageways for admitting fluid from said inlet portion to the interior of said housing, a stationary surface type filter element supported on said center tube within said housing, and said outlet portion of said center tube having passageways to permit egress of fluid from said housing after passage of the fluid admitted into the housing through said surface type filter element.

References Cited in the file of this patent

UNITED STATES PATENTS

| 1,884,616 | Dooley | Oct. 25, 1932 |
| 2,021,081 | Nagao | Nov. 12, 1935 |
| 2,087,778 | Nelin | July 20, 1937 |
| 2,442,234 | Dunmire | May 25, 1948 |
| 2,581,337 | Lapik | Jan. 8, 1952 |
| 2,642,188 | Layte | June 16, 1953 |
| 2,678,133 | Thayer et al. | May 11, 1954 |